April 26, 1932. R. C. BULKLEY 1,855,513
DRAWBAR
Filed May 17, 1930 4 Sheets-Sheet 2
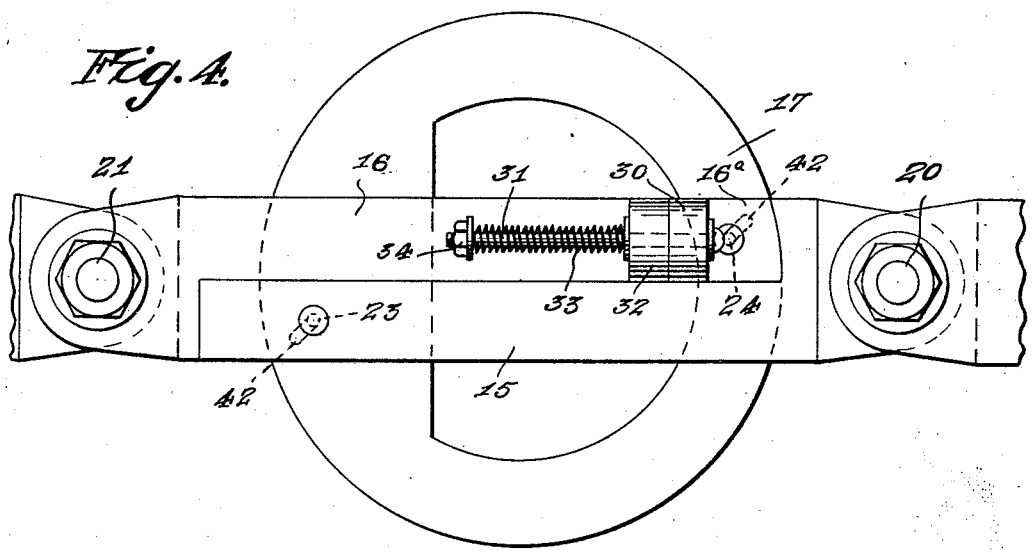
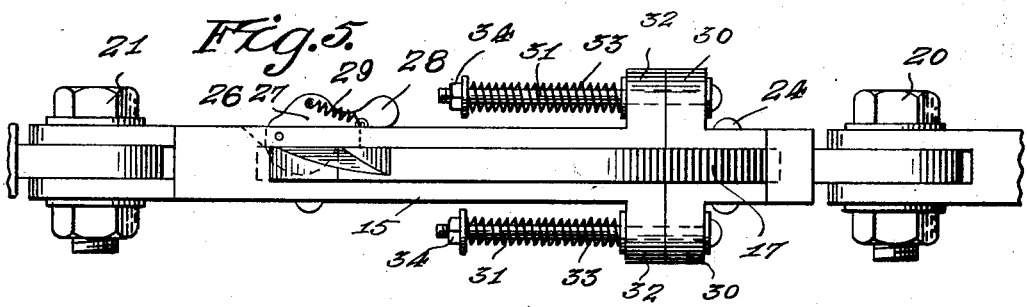
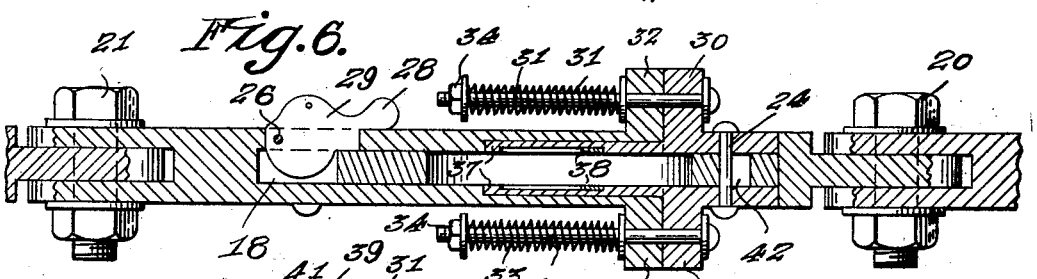
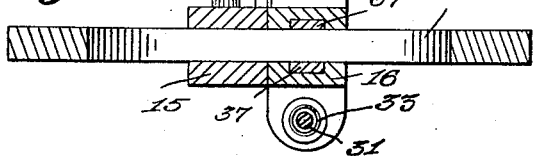
R. C. Bulkley,
INVENTOR
BY Victor J. Evans
ATTORNEY

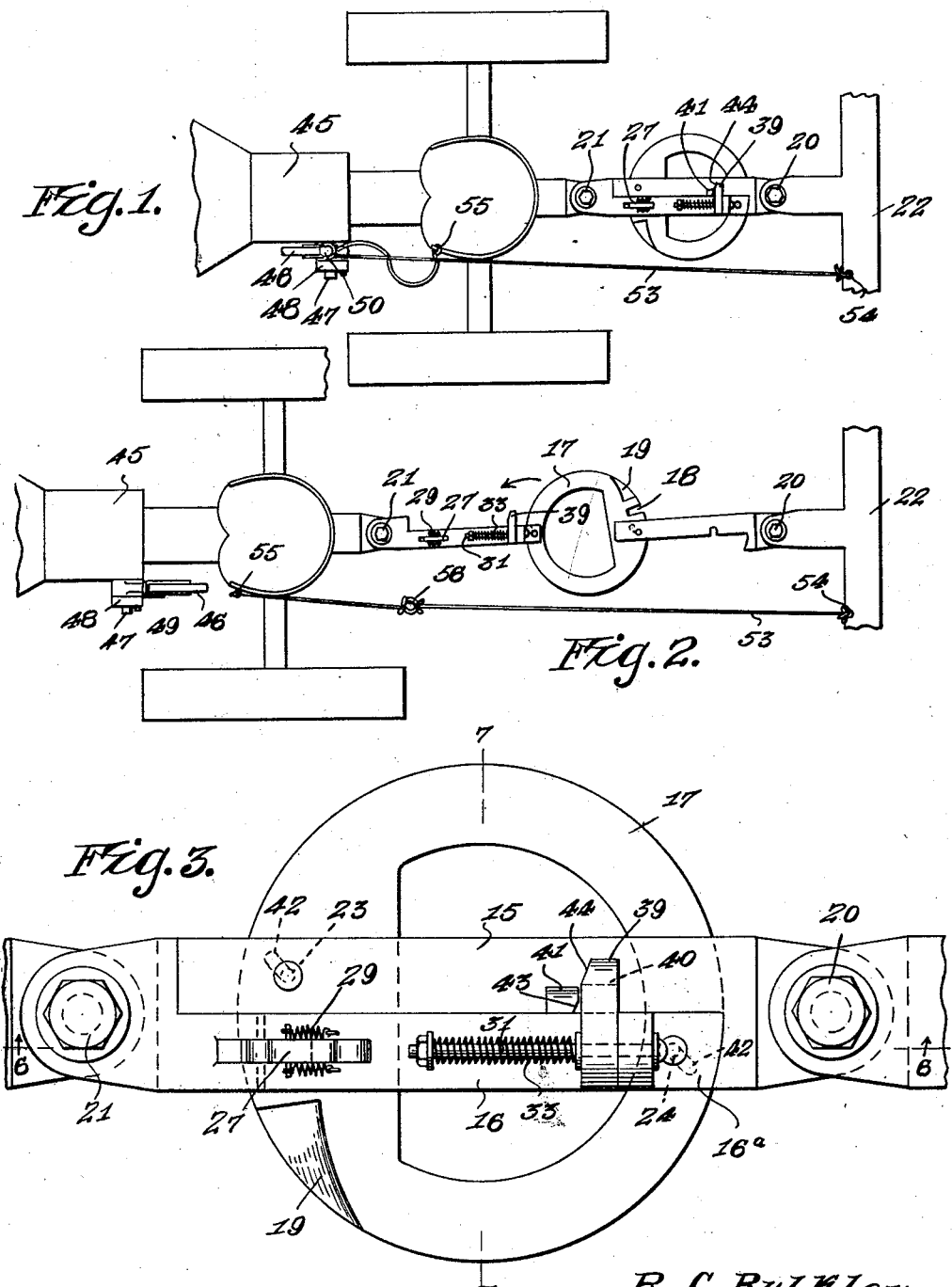

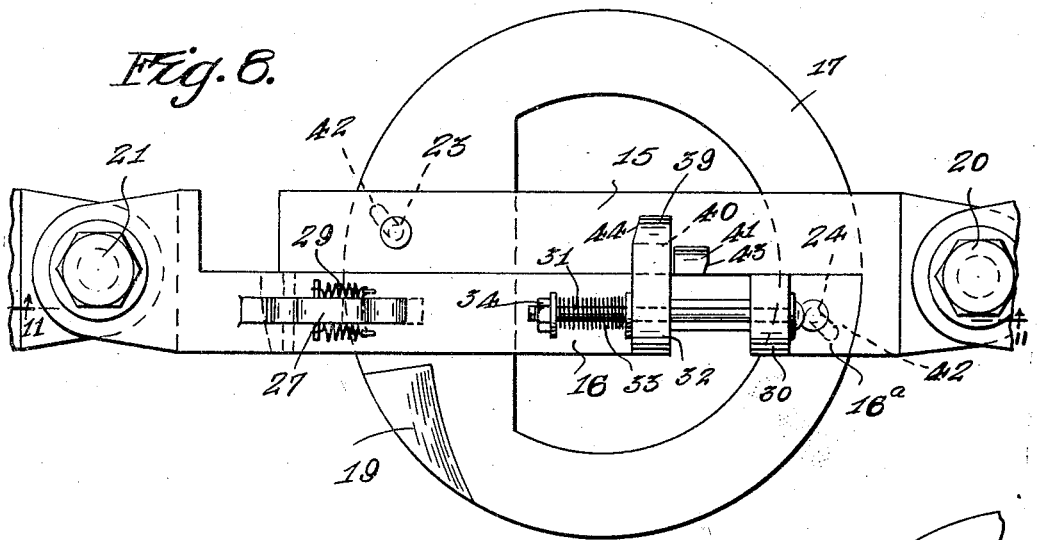
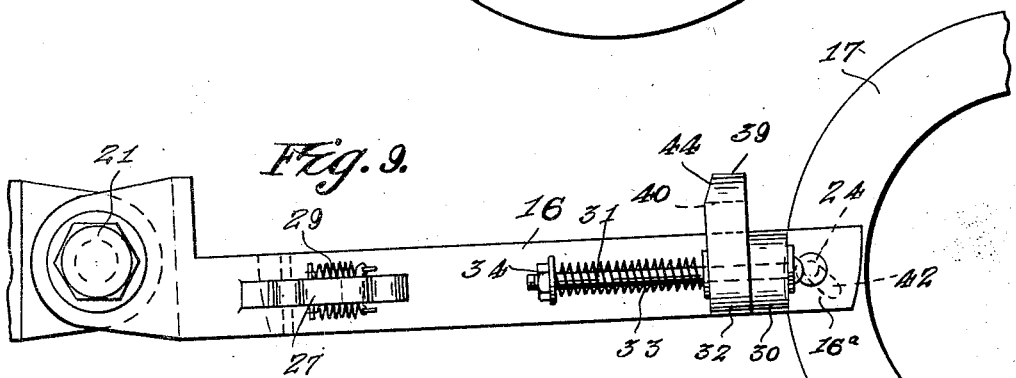
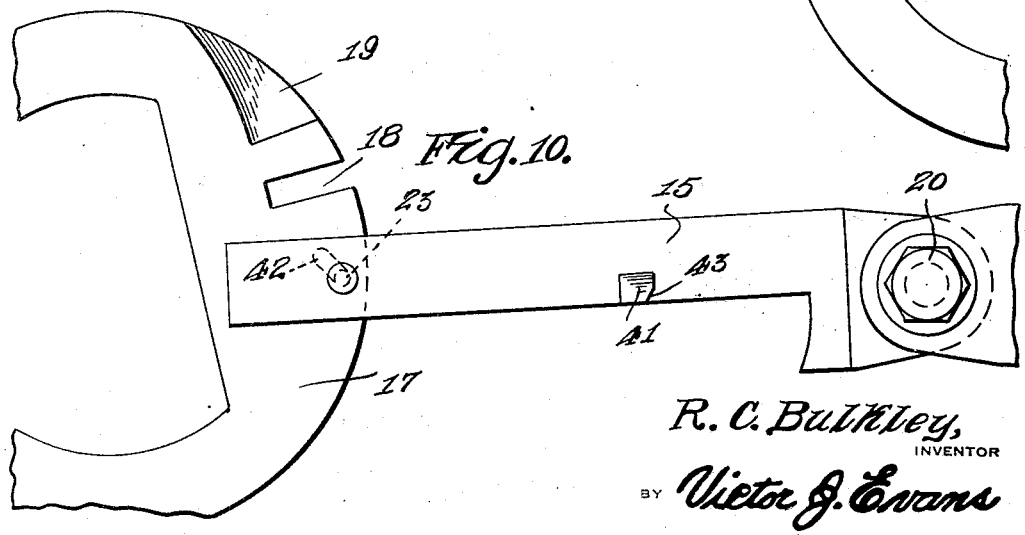

April 26, 1932.   R. C. BULKLEY   1,855,513
DRAWBAR
Filed May 17, 1930   4 Sheets-Sheet 4
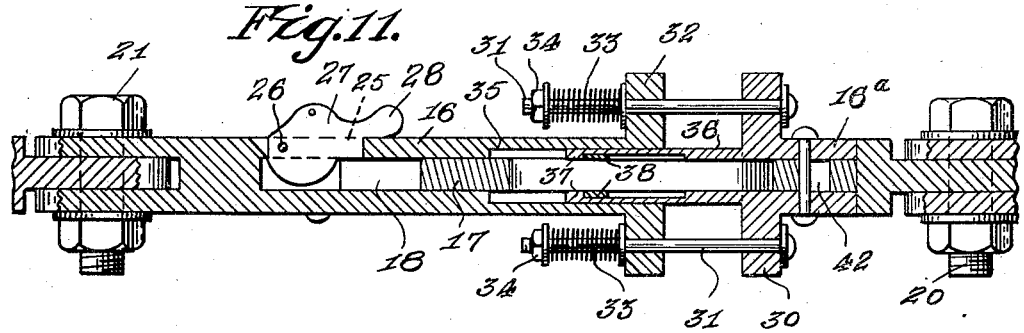
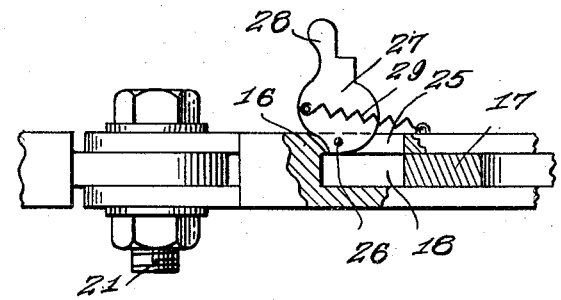
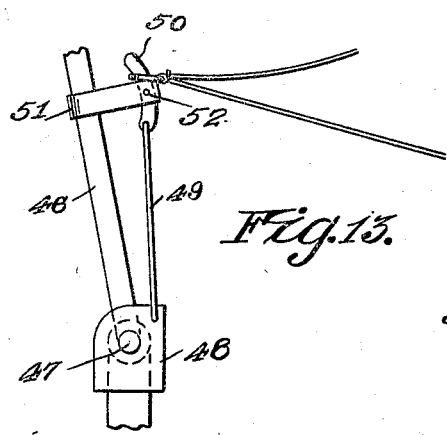
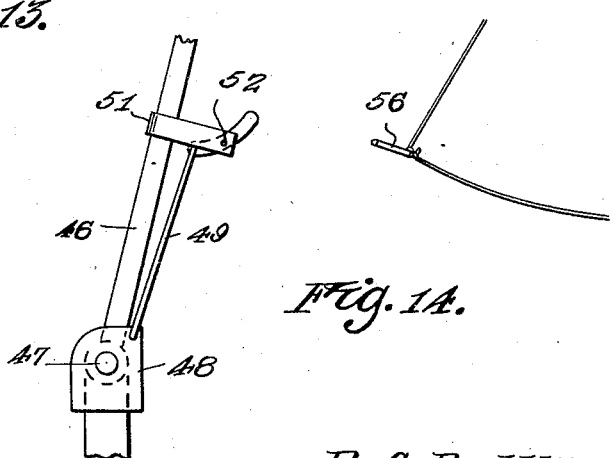
R. C. Bulkley,
INVENTOR
BY Victor J. Evans
ATTORNEY Patented Apr. 26, 1932

1,855,513

UNITED STATES PATENT OFFICE

ROLLO C. BULKLEY, OF BUHL, IDAHO

DRAWBAR

Application filed May 17, 1930. Serial No. 453,329.

This invention relates to draw bars for towing vehicles and is especially designed for connecting a tractor with an agricultural implement for the operation of the latter.

An object of the present invention is to provide a draw bar for the above purpose which will reduce danger of injury to both the tractor and the implement in the event of the latter striking an obstruction, such as a tree stump or stone.

For this purpose, the invention provides an extensible draw bar which is normally folded or retracted, and which when subjected to abnormal strain, will be automatically extended to relieve such strain, together with means actuated through the extension of the bar to open the tractor clutch and stop forward travel.

With the above and other objects in view, the invention further includes the following novel features and details of construction, to be hereinafter more fully described, illustrated in the accompanying drawings and pointed out in the appended claims.

In the drawings:—

Figure 1 is a plan view showing a fragmentary portion of a tractor and a fragmentary portion of an agricultural implement or other vehicle, connected by a draw bar constituting the present invention, the draw bar being shown in folded or retracted position.

Figure 2 is a similar view with the draw bar extended.

Figure 3 is an enlarged top plan view of the draw bar with the parts in the position shown in Figure 1.

Figure 4 is a bottom plan view of the same.

Figure 5 is an edge view.

Figures 6 and 7 are sectional views taken respectively on the lines 6—6 and 7—7 of Figure 3.

Figure 8 is a top plan view of the draw bar with the parts in the position just prior to the release of the holding dog.

Figure 9 is a fragmentary plan view of the tractor connected end of the draw bar with the parts in extended position.

Figure 10 is a similar view of the opposite end of the draw bar.

Figure 11 is a sectional view on the line 11—11 of Figure 8.

Figure 12 is a fragmentary edge view with parts broken away and shown in section and illustrating the holding dog in released position.

Figure 13 is a fragmentary elevation of the clutch attachment, the clutch lever being shown in clutch engaged position.

Figure 14 is a like view with the clutch lever in clutch released position.

Referring to the drawings in detail wherein like characters of reference denote corresponding parts, the draw bar as shown comprises a pair of end members or bars 15 and 16, and an intermediate or coupling member 17.

The members 15 and 16 are bifurcated so as to receive the member 17 and this last mentioned member is preferably circular and in the form of an annulus. The intermediate member 17 is provided with an open ended slot or notch 18 which opens through the periphery of said member, and with a beveled portion 19, adjacent said notch, the purpose of which will be presently apparent.

The members 15 and 16 are adapted to have their outer ends pivotally secured to a towed vehicle and to a tractor, as indicated at 20 and 21 respectively. This towed vehicle may be in the form of an agricultural implement or machine, a portion of which is indicated at 22. The members 15 and 16 are offset with respect to the pivots 20 and 21 and are normally arranged in overlapping relation. That is, these members are arranged in parallel contacting relation as shown in Figures 1, 3 and 4 of the drawings. In this position, the intermediate member 17 will occupy a portion within the furcations of the members 15 and 16, pivotal connection between the member 17 and the members 15 and 16 being through the medium of bolts 23 and 24 respectively. The member 16 is provided with the slot 25, and pivotally mounted within this slot as shown at 26 is a dog 27. This dog is provided with a finger-piece 28 and is yieldingly forced into the slot through the medium of springs 29. When the parts are in the position shown in Figure 3 of the drawings, the dog 27 will extend through the slot 25 and engage within the notch 18 of the member 17, as clearly shown in Figures 5 and 6.

The member 16 is of sectional formation, the outermost section 16a being pivotally connected with the member 17 through the bolt 24, as previously stated. This section 16a has oppositely and outwardly extending lugs 30 which carry rods 31. The main section of the bar 16 is also provided with oppositely and outwardly extending lugs 32 which slide upon the rods 31, and these rods have mounted thereon springs 33 whose tension is adjustable through the medium of nuts 34. A yieldable sliding connection is thus provided between the main section of the bar 16 and the section 16a.

In order to limit this sliding connection, the main section of the bar is provided with longitudinally extending, oppositely located recesses 35 which receive tongues 36 extending from the section 16a, and these tongues have lugs 37 extending from their ends. Stops 30a rigid with the main section of the bar 16 are arranged in the path of these lugs as shown in Figures 6 and 11 of the drawings.

Extending from one side of the main section of the bar 16 is an arm 39 which is provided with an opening 40, and when the parts are in the position shown in Figures 1 and 3, this opening is arranged in the path of movement of a lug 41 carried by the member 15.

With the parts arranged as shown in Figure 1 of the drawings, abnormal strain upon the bar incident to the implement 22 striking an obstruction, will cause the main section of the member 16 to move longitudinally with respect to the members 15 and 17. At the beginning of this movement, the lug 41 will enter the opening 40 in the arm 39 so as to prevent any tendency of the members 15 and 16 to move laterally outward with respect to one another. Continued movement of the member 16 will cause the dog 27 to ride out of the notch or slot 18, at which time the lug 41 will have passed through the opening 40. The members 15 and 16 will then move relatively outward and will move pivotally with respect to the member 17, so that the parts will assume the position shown in Figure 2. The distance between the tractor or towing vehicle and the implement or towed vehicle will thus be increased.

To restore the parts to their normal position, the tractor is backed in the direction of the implement 22, and as the pivot bolts 23 and 24 extend through inclined slots 42 provided in the intermediate member 17, initial movement will cause the bolts to ride to the opposite ends of the slots and throw the adjacent ends of members 15 and 16 off center in a direction indicated by the arrow in Figure 2, so that the parts will resume their normal position. During this movement, the dog 27 will ride upon the inclined portion 19 of the intermediate member so that the dog will again enter the slot or notch 18. During relative inward movement of the members 15 and 16, the beveled face 43 of the lug 41 will engage the beveled face of the arm 44 so that this lug will again be positioned to enter the opening 40. To facilitate this entrance, the end of the lug 41 is reversely beveled.

The tractor, a portion of which is indicated at 45 is provided with a clutch (not shown) for controlling its operation, and this clutch is operated by a lever 46. This lever is shown in Figures 13 and 14 of the drawings and when in the position shown in Figure 13, the clutch is engaged, while in Figure 14 the lever is in the position occupied when the clutch is disengaged. The invention mounts upon the pivot 47 of the clutch lever, a block 48, and pivotally connected with this block is a rod 49 which is also pivotally connected with a dog 50. This dog is pivotally mounted in a link 51 as shown at 52, and this link is engaged over the clutch lever 46.

A flexible member 53 has one end secured to the implement 22 as shown at 54, and its opposite end may be secured to the tractor seat or other convenient place as shown at 55. This flexible member 53 carries a ring 56 which is normally engaged over the dog 50.

At the beginning of extended movement of the draw bar, the flexible member 53 will exert a pull upon the dog 50 and will move the lever 46 from the engaged position shown in Figure 13, to the disengaged position shown in Figure 14. When this latter position is reached, the dog will be so positioned as to release the ring 56. It will be apparent from the foregoing position and accompanying drawings that the invention provides means for automatically relieving strain between a towed vehicle and a towing vehicle in the event that the latter strikes an obstruction, and for automatically throwing out the clutch of the towing vehicle so that its operation will stop. The invention further provides means for restoring the parts to their normal position merely by backing the tractor toward the implement and without the driver leaving his seat.

In the event of the vehicles becoming mired, the draw bar may be extended by manually operating the dog 27 to release the members 15, 16 and 17, so that the tractor may have limited independent forward movement with the view of reaching a better traction surface.

The invention is suceptible of various changes in its form, proportions and minor details of construction and the right is herein reserved to make such changes as proper-

I claim:

1. In an extensible draw bar, bifurcated end members, an intermediate member, means pivotally connecting said members whereby the intermediate member may be folded within the end members with the latter arranged in a parallel contacting relation, said intermediate member having an open ended slot disposed parallel with the end members, a spring influenced dog carried by one of the end members and normally engaged within the slot, means yieldingly connecting the intermediate member and the last referred to end member to provide independent longitudinal movement of said end member to release the dog and permit relative pivotal movement of the members to extend the draw bar, and means to prevent such pivotal movement until the dog is released.

2. In an extensible draw bar including a solid bifurcated end member, a sectional bifurcated end member and an intermediate member, means providing a yieldable connection between the intermediate member and the sectional end members, means pivotally connecting said members to the intermediate member whereby the intermediate member may be folded between the end members, a pivoted dog for holding the members in folded position, an apertured arm on one of the sections of the sectional end members, and a lug on the solid end member for preventing lateral movement of the members prior to the lug passing through the aperture of said arm.

3. In an extensible draw bar, bifurcated end members arranged in parallel contacting relation, an intermediate member having a beveled portion, means pivotally connecting said members whereby the intermediate member may be folded within the end members, said intermediate member having an open-ended slot disposed parallel with the end members at a point adjacent the beveled portion thereof, a spring-influenced dog carried by one of the end members and normally engaged within the slot of the intermediate member, means yieldingly connecting the intermediate member and the last referred to end member to provide independent longitudinal movement of said end member prior to release of the dog, the said dog being adapted to engage with the beveled portion of the intermediate member for the resetting of the dog in the slot of the intermediate member.

4. In an extensible draw bar, including a solid bifurcated end member, a sectional bifurcated end member and an intermediate slotted member, means providing a limited yieldable connection between the intermediate member and the sectional end members whereby the intermediate member may be folded within the said end members, a dog pivotally mounted on one of the sections of said sectional end member and adapted to engage in the slot of the intermediate member for holding the members in folded position, and means for automatically releasing the dog from the slot of the intermediate member under abnormal strain.

5. In an extensible draw bar including a solid bifurcated end member, a sectional bifurcated end member and an intermediate member, tongues formed on one of the sections of said sectional end member and adapted to engage in a groove of the other section of said sectional end member for limiting the sliding movement of said sections, means pivotally connecting said members whereby the intermediate member may be folded within the said end members, a pivoted dog for holding the members in folded position, and means formed on the intermediate member with which the dog engages for resetting the latter.

In testimony whereof I affix my signature.
ROLLO C. BULKLEY.